United States Patent Office 3,096,301
Patented July 2, 1963

3,096,301
HEAT TREATMENT OF BUTYL RUBBER WITH HALOGENATED BUTYL RUBBER AND A POLY (HALOMETHYL) PHENOL
Conrad J. Jankowski, Metuchen, James V. Fusco, Westfield, and Wilbur F. Fischer, Cranford, N.J., assignors to Esso Research and Engineering Company, a corporation of Delaware
No Drawing. Filed Nov. 2, 1959, Ser. No. 850,054
14 Claims. (Cl. 260—43)

This invention relates to a method for heat treating a rubbery polymer comprising an isoolefin with a multiolefin and more particularly it relates to an improved vulcanizate therefrom.

It is known to prepare a butyl rubber vulcanizate by heat treating the rubbery polymer in the presence of N-methyl N,4-dinitroso aniline (Elastopar) and para-dinitrosobenzene (Polyac) and subsequently curing in the presence of tetramethyl thiuram disulfide (Tuads), benzothiazyl disulfide (Altax) and tellurium diethyl dithiocarbamate. However, the physical properties of these vulcanizates have not been entirely acceptable and the expensive compounding precluded the use of the end product for certain commercial aspects where cost is a major consideration.

It has now been discovered that a low cost vulcanizate with superior physical properties can be obtained by heat treating butyl rubber with the combination of a halogenated butyl rubber and a relatively small quantity of a halogenated polymethylol phenol.

Thus, in accordance with one embodiment of this invention, a rubbery polymer is prepared comprising a major proportion of an isoolefin with a minor proportion of a multiolefin. This copolymer is subsequently heat treated at a temperature between 250° and 350° F. in the presence of both a halogenated butyl rubber, e.g., chlorinated butyl rubber, and a halogenated polymethylol phenol, e.g., brominated polymethylol phenol resin. The heat treated product therefrom is cooled to a temperature below 250° F. and then cured at an elevated temperature in the presence of curatives to provide a unitary vulcanizate with excellent physical properties.

The butyl rubber polymer is prepared by reacting 70 to 99.5 parts by weight, preferably 85 to 99.5, of an isoolefin with 30 to 0.5 parts by weight, preferably 15 to 0.5, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene. Mixture of monomers, preferably with 1 to 5 volumes of inert diluent, e.g., methyl chloride, should be cooled to a temperature between 0 and —200° C. and it is preferred that the temperature range be between —60° and —130° C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins. The polymerization reaction is rapid and the polymer precipitates out of the solution in the form of a slurry or flocculent while solid. The polymer, which is recovered and dried, has a Staudinger molecular weight between 20,000 and 150,000, preferably 45,000 to 60,000; and an iodine number between 0.5 and 50, preferably between 1 and 15. The preparation of this copolymer is described in U.S. Patent No. 2,356,128.

In accordance with the instant invention, the above rubbery polymer is heat treated in the presence of 1 to 20 parts of a halogenated butyl rubber per 100 parts of rubber (phr.) by weight, preferably 3 to 10 parts phr. Butyl rubber heretofore described is halogenated by a substitution reaction to incorporate by a substitution-reaction at least 0.5 weight percent, preferably about 1.0 weight percent, of combined halogen but not more than "X" weight percent fluorine or chlorine, or not more than about 3 "X" weight percent combined bromine or iodine therein, in accordance with the following equation:

$$X = \frac{M_3 L}{(100-L)M_1 + L(M_2+M_3)} \times 100$$

wherein $L$=mole percent of the multiolefin in the polymer
$M_1$=molecular weight of the isoolefin
$M_2$=molecular weight of the multiolefin
$M_3$=atomic weight of halogen.

In other words, there should be at least about 0.5 weight percent of combined halogen in the polymer but not more than about one atom of combined fluorine or chlorine or 3 atoms of combined bromine or iodine per double bond in the polymer.

The halogenation is generally conducted between about —50° C. and about 200° C., and preferably between 20° and 50° C.; however, the temperature is dependent upon the particular halogenating agent which is used. The time interval is usually within the range of one minute to several hours, e.g., 3 minutes. The pressure may vary from 0.5 to 400 p.s.i.a.; however, atmospheric pressure is preferred. It is desirable to halogenate the butyl rubber copolymer while it is dissolved in a $C_4$ to $C_{10}$ hydrocarbon, a $C_4$ to $C_{10}$ halogenated hydrocarbon, carbon tetrachloride, chloroform, hexane, benzene and/or chlorobenzene. Suitable halogenating agents which may be employed are gaseous chlorine, liquid bromine, iodine monochloride, hydrogen fluoride, alkali metal hypobromites or hypochlorides, sulfur bromides or chlorides, bromo- or chloro-hydantoins, N-bromosuccinimide, and other common halogenating agents. The resulting halogenated butyl rubber polymer may be recovered by precipitating with an alcohol, acetone or any other non-solvent, and subsequently drying at a temperature between 0° and 180° C. within a pressure range from 1 to 760 mm. of Hg. Other methods for recovering the halogenated butyl rubber polymer from the hydrocarbon solution are conventional spray and drum drying techniques. Alternatively, the solution with the halogenated rubbery polymer therein can be injected into a vessel which contains steam and/or agitated hot water. The temperature must be high enough to flash off the solvent whereby an aqueous slurry halogenated butyl rubber is formed therefrom. The halogenated butyl rubber is subsequently separated from this slurry by filtration. After a drying step, the polymer is recovered as a "crumb," a dense sheet, or a slab, depending upon the milling and extruding procedures which are used. The halogenated copolymer generally has a viscosity average molecular weight between about 50,000 and 4,000,000. The mole percent unsaturation is usually between 0.5 and 15.0, preferably 0.6 and 5.0.

Furthermore, in accordance with this invention, the aforementioned admixture of butyl rubber and halogenated butyl rubber are heat treated in the presence of a halogenated polymethylol phenol resin. The polymethylol phenol resins per se are generally prepared by reacting a para-substituted or meta-substituted phenol with an excess of formaldehyde in the presence of a strong alkaline catalyst, e.g., an alkali metal hydroxide. For example, a mixture of the phenol, formaldehyde and alkaline catalyst is heated at a temperature between 25 and 100° C. to form a phenol methylol, e.g. para-substituted 2,6-dimethylol phenol. This material can be isolated by acidification and separation of the oily layer. A higher molecular weight can be formed by heating the product at a temperature between 75° and 175° C. The reaction can be carried past the monomer stage to the resinous stage whereupon the mixture is neutralized and water is removed to give the resinous material. The following dimethylol phenols are within the purview of the instant invention:

2,6-dimethylol-4-octyl phenol;
2,6-dimethylol-4-methyl phenol;
2,6-dimethylol-4-tertiary butyl phenol;
2,6-dimethylol-4-dodecyl phenol;
2,6-dimethylol-4-phenyl phenol;
2,6-dimethylol-4-benzyl phenol;
2,6-dimethylol-4-(alpha, alpha-dimethylbenzyl)phenol; and
2,6-dimethylol-4-cyclohexyl phenol.

The halogenated polymethylol phenols as defined in this invention are provided by halogenating the polymethylol phenols, e.g., 2,6-dimethylol para-substituted phenols, either in the monomeric or polymeric form, to at least partially substitute halogen for the hydroxyl portion of the methylol groups; or by controlled halogenating of the aforementioned methylol containing resins prepared by the condensation of an aldehyde with a substituted phenol having the two ortho positions unoccupied. This halogenation is generally performed at a temperature between 0 and 150° C., preferably between 20 and 80° C. The halogenating agents which are suitable for the present invention are gaseous hydrogen fluoride, hydrogen chloride, hydrogen bromide, hydrogen iodide, gaseous chlorine, liquid bromine, alkali metal hypochlorites or hypobromites, concentrated aqueous hydrogen iodine solutions, $C_4$ to $C_{10}$ tertiary alkyl hypochlorites, sulfur bromides, sulfuryl chloride, pyridinium chloride perchloride, N-bromosuccinimide, alpha-chloroacetoacetanilide, N,N'-dichloro-5,5 dimethylhydantoin, iodine halides, trichlorophenol chloride, N-chloroacetamide, beta-bromo-methyl phthalimide, etc. The preferred halogenating agents are gaseous hydrogen fluoride, hydrogen chloride, hydrogen bromide, and hydrogen iodide, chlorine. Generally the polymethylol compound or resin is halogenated in the presence of an inert organic solvent, e.g., hexane, benzene, chloroform, or carbon tetrachloride by forming 20 to 50 wt. percent solution which is subsequently contacted with a halogenating agent for a few minutes up to several days, depending upon the reactivity of the specific halogenating agent. The amount of halogenating agent employed will vary from 0.3 to 4 moles per mole of polymethylol phenol. The halogenated polymethylol hydrocarbon-substituted phenol can contain from 1 to 60 wt. percent of combined halogen. The monomeric form of these compounds can be represented by the following general structure:

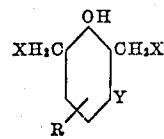

wherein R is an alkyl, aryl, or alkaryl hydrocarbon containing 4 to 16 carbon atoms located in the meta or para position (4–5 position): X is a halogen such as fluorine, chlorine, bromine, or iodine; and Y is hydrogen or hydroxy. This therefore includes the following compounds: 2,6-dichloromethyl-4-tertiarybutyl phenol, 2,6-dichloromethyl-4-octyl phenol, 2,6-diiodomethyl-4-dodecyl phenol, 2,6-dichloromethyl-4-phenyl phenol, 2,6-dibromomethyl-5-pentadecyl phenol, 2,6-dibromomethyl-5-pentadecyl resorcinol and 2,6-dibromomethyl-4-cumyl phenol. If desired, these compounds may be blended with polymethylol compounds or resins to obtain a composition having the desired curing rate. These halogenated polymethylol phenol resins are generally incorporated within a range of 1 to 10 parts, preferably 0.4 to 3 parts phr. in conjunction with the halogenated butyl rubber.

The rubbery polymer can also be heat treated with other compounding ingredients such as mineral fillers, e.g., hydrated silica and carbon black and antioxidants. The heat treating operation can be performed statically or dynamically, e.g., hot milling; or with intermediate combinations of alternate or cyclic static heating followed by a short interval of mastication. The heat treatment temperature is generally within the range of 250° to 450° F., preferably from 300° to 380° F. The time is inversely dependent upon the temperature, and ranges from 1 to 8 hours with static heating at 250° F., and ranges from 5 to 30 minutes with dynamic heating at 350° to 450° F. The heating time in hours may be expressed by the formula:

$$\text{Hours} = \frac{K}{T - 200}$$

wherein T is the temperature in degrees Fahrenheit, and K is a constant of 50 to 600, preferably 40 to 550.

The heat treatment should be terminated with a final mastication and/or mixing to provide a mixture which is homogeneous and is in a smooth workable plastic condition.

The heat treated rubbery mixture is subsequently cooled to a temperature below 250° F. in order to incorporate curing agents without scorching occurring therein. These curing agents are generally added at a temperature between 100° and 150° F. The usual curing agents are 0.5 to 3 parts of sulfur phr.; 0.5 to 5 parts of accelerators phr., e.g., tetramethyl thiuram disulfide, 2-mercapto benzothiazole, benzothiazole disulfide, bis-4-ethylthiazole disulfide, diphenyl guanidine, butyraldehyde-aniline products, zinc dimethyl dithiocarbamate, thiazole guanidine, and aldehyde-amines. Other materials which may be incorporated into the heat treated rubbery mixture, after it has been cooled, include non-sulfur curing agents such as p-dinitroso benzene, and p-quinone dioxime, antioxidants and stabilizers, e.g., stearic acid; zinc oxide; pigments and/or dyes; processing aids, e.g., waxes, resins and/or oils; extenders, e.g., non-volatile mineral oils and/or esters.

After the curing and/or compounding agents have been incorporated into the heat treated rubbery polymer, the admixture therefrom is extruded or molded into any desired form. The extruded admixture is subsequently cured by heating to a temperature between 250° and 400° F. for 240 to 50 minutes, or by heating to a relatively high temperature between 300° and 400° F. for 60 to 0.5 minutes.

Thus, in accordance with this invention is it now possible to provide a low-cost butyl rubber vulcanizate which has exceptional physical properties. It should be noted that the surprising, unobvious result of this invention is that a synergistic effect occurs by heat treating the butyl rubber with both the halogenated butyl rubber and the halogenated polymethylol phenol as compared with either halogenated compound alone.

The following examples are submitted to illustrate but not to limit this invention:

EXAMPLE 1

A rubbery copolymer was prepared comprising 97.5% isobutylene with 2.5% isoprene. One hundred parts of this butyl rubber copolymer were heat treated at a temperature of 310° F. for 4 minutes in the presence of compounding ingredients listed herebelow.

*Table I*

| Compounds (parts by Wt.) | A | B | C | D | E |
|---|---|---|---|---|---|
| Butyl Rubber Copolymer | 100 | 100 | 95 | 90 | 100 |
| Chlorinated Butyl Rubber [a] | | | 5 | 10 | |
| SAF Black [b] | 40 | 40 | 40 | 40 | 40 |
| FT Black [c] | 10 | 10 | 10 | 10 | 10 |
| Elastopar [d] | | 1.0 | | | |
| SP-1055 [e] | | | 2 | | 2 |
| Zinc Oxide | 5 | 5 | 5 | 5 | 5 |
| Process Oil [f] | 10 | 10 | 10 | 10 | 10 |
| Stearic Acid | 1.0 | 1.0 | 1.0 | 1.0 | 1.0 |

[a] 98% isobutylene with 2% isoprene with 1.15% chlorine substituted.
[b] Super Abrasion Furnace Carbon Black.
[c] Fine Thermal Carbon Black.
[d] N-methyl N,4 dinitroso aniline.
[e] Bromomethyl alkylated phenol formaldehyde resin (3.7% Br).
[f] Solvent 150 Neutral, paraffinic mineral oil.

The heat treated butyl rubber was subsequently cooled to a temperature of 150° F. and 1.5 parts of sulfur, 1.3 parts of tellurium diethyl dithiocarbamate (Tellurac) and 1 part of benzothiazyl disulfide (Altax) were incorporated therein. The admixture therefrom was then cured at a temperature of 307° F. for 40 minutes in a press mold and the physical properties were determined as indicated herebelow:

*Table II*

| Physical Properties | A | B | C | D | E |
|---|---|---|---|---|---|
| Tensile strength (p.s.i.) | 2,000 | 2,100 | 2,000 | 1,840 | 1,950 |
| Modulus at 3,000, 300% (p.s.i.) | 1,150 | 1,700 | 1,730 | 1,500 | 1,040 |
| Elongation (percent) | 480 | 350 | 350 | 350 | 500 |
| Shore Hardness | 63 | 63 | 60 | 62 | 63 |
| Relative Damping (percent) | 39.5 | 39.4 | 28.9 | 34.4 | 47.0 |
| Dynamic Modulus (p.s.i.) | 650 | 569 | 480 | 544 | 594 |
| Intrinsic Viscosity (p.s.i. × $X_i$) | 14.7 | 10.7 | 7.7 | 10.5 | 17.4 |
| Dynamic Drift (percent) | 9.0 | 5.8 | 5.4 | 7.8 | 11.0 |
| Permanent Set (percent) | 14.0 | 10.2 | 9.1 | 11.0 | 17.0 |
| Temperature, °F | 38 | 31 | 31 | 34 | 34 |

The above example demonstrates that vulcanizate C which has been heat treated in the presence of a chlorinated rubber and a brominated polymethylol phenol has physical properties which are superior to vulcanizate B which has been heat treated in the presence of Elastopar; for example, the relative damping, dynamic modulus and intrinsic viscosity are considerably lower in vulcanizate C than in vulcanizate B which is commercially advantageous. Furthermore, it is clearly shown above that unexpected synergism occurs by heat treating the butyl rubber copolymer with both a chlorinated butyl rubber and a brominated polymethylol phenol as compared with a vulcanizate which has been heat treated with only one of these halogenated compounds. One illustration of this synergistic effect is seen in the relative damping, where vulcanizate A is 39.5%, vulcanizate E with only brominated polymethylol phenol is 47% and vulcanizate D with only chlorinated butyl rubber is 34.4%. Therefore, one would expect that vulcanizate C with both halogenated compounds therein would have a value somewhere between 34.4 and 47%; however, the relative damping is actually 28.9%.

EXAMPLE 2

A copolymer of butyl rubber was prepared comprising 97.5% isobutylene with 2.5% isoprene. One hundred parts of this butyl rubber copolymer were heat treated at a temperature of 310° F. for 4 minutes in the presence of compounding ingredients listed in Table III.

*Table III*

| Compounds (parts by wt.) | F | G | H |
|---|---|---|---|
| Butyl Rubber (Enjay Butyl 325) | 100 | 95 | 95 |
| Chlorinated Butyl Rubber MD-551 [a] | | 5 | 5 |
| SAF Black [b] | 40 | 40 | 40 |
| FT Black [c] | 10 | 10 | 10 |
| SP-1055 [d] | | | 2 |
| Zinc Oxide | 5 | 5 | 5 |
| Process Oil [e] | 10 | 10 | 10 |
| Stearic Acid | 1 | 1 | 1 |
| Unbrominated Resin [f] | | 2 | |

[a] 98% isobutylene with 2% isoprene and 1.15% chlorine.
[b] Super Abrasion Furnace Carbon Black.
[c] Fine Thermal Carbon Black.
[d] Bromomethyl alkylated phenol formaldehyde resin (3.7% Br).
[e] Solvent 150 Neutral, paraffinic mineral oil.
[f] Alkylated phenol formaldehyde resin (Amberol ST-137).

The heat treated butyl rubber was subsequently cooled to a temperature of 150° F. and 1.5 parts of sulfur, 1.3 parts of Tellurac and 1 part of Altax were incorporated therein. This admixture was then cured at a temperature of 307° F. for 40 minutes in a press mold and the physical properties were determined as indicated below:

*Table IV*

| Physical Properties | F | H | G |
|---|---|---|---|
| Tensile strength (p.s.i.) | 2,000 | 2,210 | 1,940 |
| Modulus at 3,000, 300% (p.s.i.) | 1,430 | 2,160 | 1,680 |
| Elongation (percent) | 400 | 310 | 340 |
| Shore hardness | 69 | 62 | 61 |
| Dynamic Modulus (p.s.i.) | 830 | 485 | 520 |
| Dynamic Drift (percent) | 7.0 | 4.6 | 5.6 |
| Permanent Set (percent) | 11.0 | 7.2 | 10.0 |
| Temperature, °F | 33 | 25 | 29 |

This example shows the advantage of using a halogenated polymethylol phenol over a polymethylol phenol per se.

EXAMPLE 3

The rubbery copolymer of Example 1 was compounded with the ingredients as shown in Table V (for the three compositions I, J, and K) with the admixtures of all ingredients shown (except for sulfur, Tellurac, and Altax) being heat treated for four minutes at 310° F. as shown in Example 1. The heat treated butyl rubber admixtures were then cooled to a temperature of 150° F. and the amounts of sulfur, Tellurac, and Altax as shown in Table V were admixed and the resultant admixture cured for 40 minutes at 307° F. as stated in Table V. The physical properties of vulcanizates I, J, and K therefrom were determined as shown in Table V.

*Table V*

| | I | J | K |
|---|---|---|---|
| Enjay Butyl 325 | 95 | 95 | 100 |
| SAF Black | 40 | 40 | 40 |
| FT Black | 10 | 10 | 10 |
| MD-551 | 5 | 5 | |
| SP-1055 | 2 | | 3 |
| Zinc Oxide | 5 | 5 | 5 |
| Process Oil | 10 | 10 | 10 |
| Stearic Acid | 1.0 | 1.0 | 1.0 |
| Sulfur | 1.5 | 1.5 | 1.5 |
| Tellurac | 1.3 | 1.3 | 1.3 |
| Altax | 1 | 1 | 1 |
| Cure 40' at 370° F. | | | |
| Physical Properties: | | | |
| Tensile strength (p.s.i.) | 2,000 | 1,650 | 2,150 |
| Modulus at 300% (p.s.i.) | 1,730 | 1,520 | 1,140 |
| Elongation (percent) | 350 | 330 | 510 |
| Shore "A" Hardness | 60 | 64 | 64 |
| Dynamic Properties: | | | |
| Percent Relative Damping | 28.9 | 41.75 | 44.3 |
| Dynamic Modulus (p.s.i.) (poise) | 486 / 7.7×10⁴ | 537 / 13.3×10⁴ | 537 / 15.6×10⁴ |
| Goodrich Flexometer: | | | |
| Dynamic Drift (percent) | 5.4 | 6.0 | 10.9 |
| Permanent Set (percent) | 9.1 | 9.2 | 17.5 |
| Temperature, °F | 31 | 31 | 38 |

It should be noted that a synergistic effect occurs, especially in dynamic properties, when butyl rubber is cured in the presence of both halogenated compounds.

Having described the general nature and specific embodiments of the present invention, the true scope is now particularly pointed out in the appended claims.

What is claimed is:

1. A method which comprises heat treating an admixture of a rubbery polymer of 70 to 99.5 parts by weight of a $C_4$–$C_7$ isoolefin and 30 to 0.5 parts by weight of a $C_4$–$C_{10}$ conjugated diolefin, a halogenated rubbery polymer of the aforementioned type in which the halogen is selected from the group consisting of chlorine and bromine, and a poly (halomethyl) phenol at a temperature of between 250 and 350° F. for a period of time, in hours, equal to K divided by T minus 200, wherein T is the heating temperature in degrees Fahrenheit and K is between 50 and 600, cooling the heat treated admixture to a temperature below 250° F., followed by admixing curing agents with said admixture and curing the so treated admixture to produce a vulcanizate having a relative damping below 34.4%.

2. A method as in claim 1 wherein the halomethyl groups of the poly (halomethyl) phenol are selected from the group consisting of chloromethyl and bromomethyl.

3. A method as in claim 1 wherein the admixture contains per 100 parts of said rubbery polymer, from 1 to 20 parts of said halogenated rubbery polymer and from 1 to 10 parts of said poly (halomethyl) phenol.

4. A method as in claim 1 wherein the curing agents are elemental sulfur and vulcanization accelerators.

5. A method as in claim 1 wherein the rubbery polymer is prepared from isobutylene and isoprene, and the halogenated rubbery polymer is prepared by halogenating a rubbery polymer of isobutylene and isoprene.

6. A method as in claim 1 wherein the poly (halomethyl) phenol is a 2.6 dibromomethyl, 4-alkyl phenol, wherein the alkyl group contains from 4 to 16 carbon atoms.

7. A composition comprising an admixture of a rubbery polymer of 70 to 99.5 parts by weight of a $C_4$–$C_7$ isoolefin with 30 to 0.5 parts by weight of a $C_4$–$C_{10}$ conjugated diolefin, a halogenated rubbery polymer of the aforementioned type in which the halogen is selected from the group consisting of chlorine and bromine, and a poly (halomethyl) phenol, which admixture has been heat-treated at a temperature of between 250 and 350° F. for a period of time, in hours, equal to K divided by T minus 200, wherein T is the heating temperature in degrees Fahrenheit and K is between 50 and 600, and wherein the so treated admixture is cooled to a temperature below 250° F. followed by adding curing agents thereto, and curing the resultant admixture to produce a vulcanizate having a relative damping below 34.4%.

8. A composition as in claim 7 wherein the halomethyl groups of the poly (halomethyl) phenol are selected from the group consisting of chloromethyl and bromomethyl.

9. A composition as in claim 7 wherein the admixture contains per 100 parts of said rubbery polymer, from 1 to 20 parts of said halogenated rubbery polymer, and from 1 to 10 parts of said poly (halomethyl) phenol.

10. A composition as in claim 7 wherein the added curing agents are elemental sulfur and vulcanization accelerators.

11. A composition as in claim 7 wherein the rubbery polymer is prepared from isobutylene and isoprene, and the halogenated rubbery polymer is prepared by halogenating a rubbery polymer of isobutylene and isoprene.

12. A composition as in claim 7 wherein the poly (halomethyl) phenol is a 2.6 dibromomethyl, 4-alkyl phenol, wherein the alkyl group contains from 4 to 16 carbon atoms.

13. A method which comprises heat treating 95 parts of a rubbery polymer of 95.5% isobutylene with 2.5% isoprene at a temperature of 310° F. for 4 minutes in the presence of 5 parts of a halogenated butyl rubber polymer of 98% isobutylene and 2% isoprene with 1.15% chlorine substituted therein, and 2 parts of a bromomethyl alkylated phenol formaldehyde resin; cooling said heat-treated rubber to a temperature of 105° F.; curing said cooled rubber at a temperature of 307° F. for 40 minutes to provide a vulcanizate therefrom with a relative damping of 28.9%.

14. A vulcanizate which comprises 95 parts of a rubbery copolymer of 97.5% isobutylene with 2.5% isoprene, 5 parts of a halogenated copolymer of 98% isobutylene with 2% isoprene with 1.5% chlorine substituted therein, and 2 parts of bromomethyl alkylated phenol formaldehyde resin which has been heat treated at a temperature of 310° F. for 4 minutes with subsequent cooling at 150° F.; said vulcanizate having been cured at a temperature of 307° F. for 40 minutes to provide a unitary product therefrom with a relative damping of 28.9%.

References Cited in the file of this patent

UNITED STATES PATENTS

| | | |
|---|---|---|
| 2,726,222 | Palmquist et al. | Dec. 6, 1955 |
| 2,857,357 | Smith | Oct. 21, 1958 |
| 2,918,448 | Viohl | Dec. 22, 1959 |
| 2,948,700 | Eby et al. | Aug. 9, 1960 |
| 2,972,600 | Braidwood | Feb. 21, 1961 |
| 2,987,497 | Leshin | June 6, 1961 |

OTHER REFERENCES

Van der Meer, Rubber Chemistry and Technology, volume 18, pages 853–873 (1945).